(12) United States Patent
Magid

(10) Patent No.: US 7,338,020 B2
(45) Date of Patent: Mar. 4, 2008

(54) ATTACHMENT DEVICE FOR NON-POROUS SURFACES

(76) Inventor: Edward Magid, 1560 Hatboro Rd., Ivyland, PA (US) 18974

( * ) Notice: Subject to any disclaimer, the term of this patent is extended or adjusted under 35 U.S.C. 154(b) by 224 days.

(21) Appl. No.: 11/066,036

(22) Filed: Feb. 25, 2005

(65) Prior Publication Data
US 2005/0205732 A1     Sep. 22, 2005

Related U.S. Application Data

(60) Provisional application No. 60/548,810, filed on Feb. 28, 2004.

(51) Int. Cl.
*F16B 47/00* (2006.01)

(52) U.S. Cl. ............................... 248/206.2; 248/205.5; 248/205.8

(58) Field of Classification Search ............ 248/205.5, 248/205.7, 205.8, 206.2, 362, 363, 309.1–309.3, 248/500, 904
See application file for complete search history.

(56) References Cited

U.S. PATENT DOCUMENTS

| | | | |
|---|---|---|---|
| 3,020,017 A * | 2/1962 | Watson ..................... | 248/205.8 |
| 4,580,751 A * | 4/1986 | Panzer ..................... | 248/205.8 |
| 5,961,087 A * | 10/1999 | Lee ............................. | 248/362 |
| 6,234,435 B1 * | 5/2001 | Yeh ......................... | 248/205.5 |
| 6,478,271 B1 * | 11/2002 | Mulholland .............. | 248/205.8 |
| 6,550,735 B1 * | 4/2003 | Zheng ......................... | 248/304 |
| 6,749,160 B1 * | 6/2004 | Richter ..................... | 248/206.2 |
| 6,962,314 B2 * | 11/2005 | Hsu ......................... | 248/205.5 |
| 7,021,593 B1 * | 4/2006 | Fan ......................... | 248/206.2 |

* cited by examiner

*Primary Examiner*—Carl D. Friedman
*Assistant Examiner*—Tan Le
(74) *Attorney, Agent, or Firm*—Armand M. Vozzo, Jr.

(57) ABSTRACT

An attachment device for mounting an object to non-porous surface comprises a spring-loaded suction pad assembly, a rigid cover formed to fit upon the pad assembly, and an articulated actuator arm pivotally coupled to the pad assembly and movable upon the cover to selectively urge the pad assembly into sealing contact with the surface. The suction pad assembly includes a pliable pad member having a rigid stem centrally affixed thereto and a compression spring set coaxially about the stem between the pad member and the inside cover to apply pressure upon the pad member. The articulated actuator arm includes a base member pivotally coupled to the stem and a mounting sleeve flexibly joined to the base member with an extension spring coaxially engaged therethrough. The base member is formed to compress or release the suction pad assembly and is adapted to be locked to the cover in the compressed position.

16 Claims, 5 Drawing Sheets

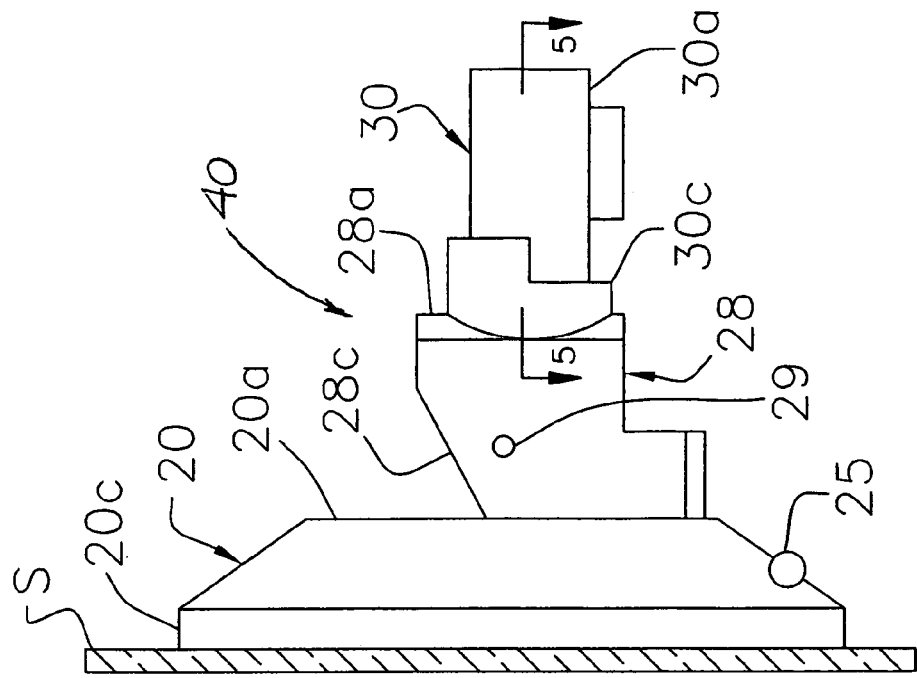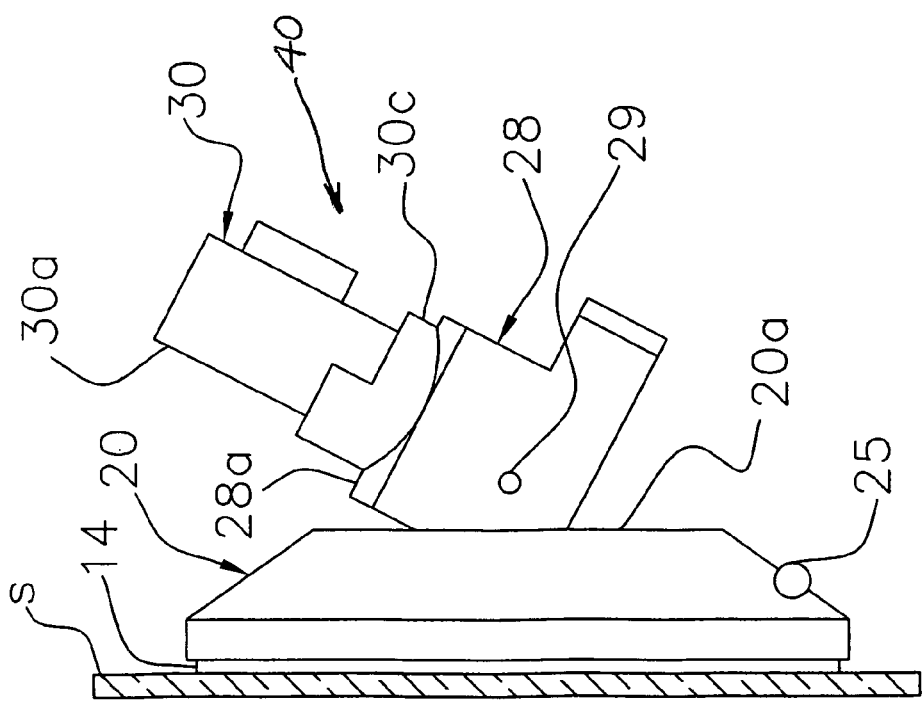

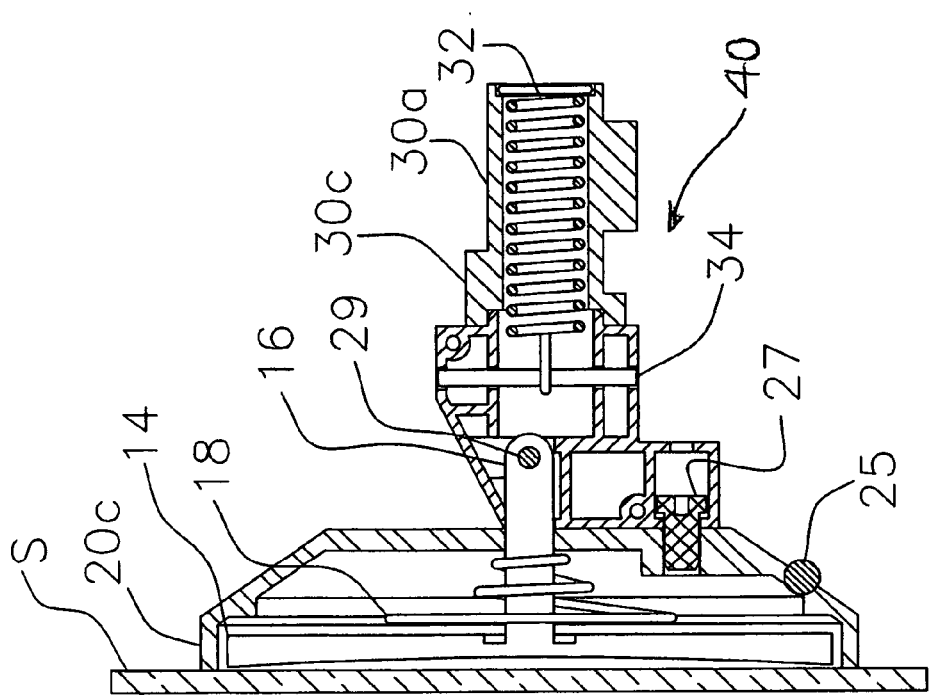
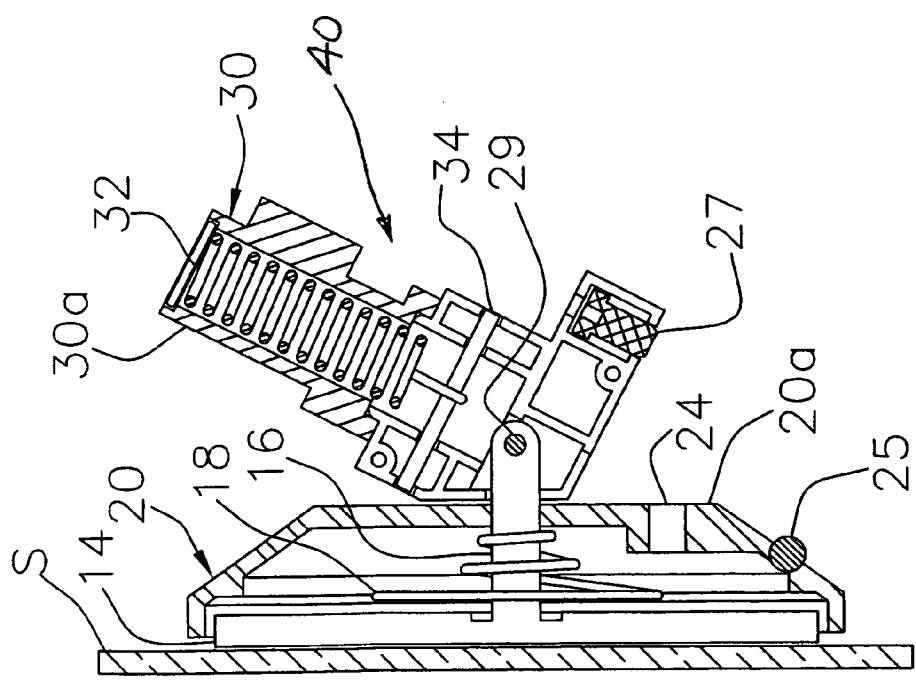

ATTACHMENT DEVICE FOR NON-POROUS SURFACES

CROSS-REFERENCE TO RELATED APPLICATION

This application is a continuation-in-part of Provisional Application Ser. No. 60/548,810 filed Feb. 28, 2004 for Attachment Device for Non-Porous Surfaces.

BACKGROUND OF THE INVENTION

The present invention relates to attachment devices of the type that employ suction pads or like pliable members to secure objects upon a smooth surface, and more particularly to an improved suction-type attachment device including a spring-loaded suction pad and associated actuator means having articulated members pivotally coupled so that surface attachment is maintained despite deflection of an object mounted thereon.

Suction devices employing cup or pad-like members have been commonly used to mount and secure objects to smooth, non-porous surfaces such as glass, metal, plastic and tile. The typical suction device used in this capacity includes a pliable member made of a resilient rubber or plastic material that is generally arcuate or circular in form with some degree of concavity to its shape. Normally a stem is integrally formed on the pliable member and used to apply pressure upon the pliable member against the mounting surface and as the place of attachment for the object to be supported by the suction device. In terms of operation, when the pliable member is pressed against a smooth, non-porous surface, the concavity of the member is reduced, forcing air to be expelled so that the member forms an air-tight seal against the smooth surface. Pressure of the atmosphere around the suction device generally retains the pliable member against the surface until it is deflected and sufficiently disturbed. When that occurs, the air-tight seal is broken, releasing the suction attachment to the surface and allowing removal of the device. While such suction devices have been effective in mounting a variety of objects to walls and other vertical surfaces, they are often difficult to position properly and then reposition because the suction forces that develop between the pliable member and the mounting surface tend to resist corrective movements of the device. Also, once they are positioned properly and secured to a wall or other surface, these suction devices have been found to separate from their attachment under the force of weight of relatively heavy objects as well as by deflection forces that can move the object just enough in any direction to cause a shearing effect that releases the air-tight seal.

In the field of retail marketing promotions, a variety of displays and other merchandising units, such as coupon dispensers, are mounted in store aisles on shelves and display cases to draw the attention of consumer shoppers. Many of these merchandising units are bulky and relatively heavy and most are mounted in such a way as to project into aisle and the path of the shopper and thus be prone to impact and deflection. In light of this manner of mounting these merchandising units into the store aisles, flexible mounting devices have been devised and developed that attach securely to store shelves, typically using a combination of brackets and clips, and further allow deflection of the mounted merchandising units without injuring the consumer or damaging the units themselves. While these flexible mounting devices have been effective in their attachment to the store shelves, they have not been articulated so as to provide firm but deflectable attachment to the smooth, non-porous surfaces, such as glass doors and metal panels, found in retail stores at point-of-purchase locations. Accordingly, there is a need for an improved type of suction-type attachment device for securing objects to non-porous surfaces, particularly those objects that are subject to deflection, such as those retail merchandising units mounted at point-of-purchase locations.

SUMMARY OF THE INVENTION

Accordingly, it is a general purpose and object of the present invention to provide an improved suction-type attachment device that is more effective than those heretofore devised and developed for mounting and securing objects to smooth, non-porous surfaces.

A more particular object of the present invention is to provide an improved suction-type attachment device for mounting a designated object to a smooth, non-porous surface with further capability of maintaining firm attachment to the surface despite deflection of the mounted object.

Another object of the present invention is to provide a deflectable suction-type attachment device for non-porous wall surfaces that is capable of mounting and supporting heavier objects without being detached from the wall surface.

Still another object of the present invention is to provide an improved attachment device for a non-porous surface that is easy to implement and secure in proper position, and once secured in place on the surface, that is resistant to tampering and theft.

A still further object of the present invention is to provide an attachment device for non-porous surfaces that is relatively inexpensive to manufacture, easy to assemble and operate, and reliable in its performance.

Briefly, these and other objects of the present invention are accomplished by an improved attachment device for mounting an object to non-porous surface comprising a spring-loaded suction pad assembly, a rigid cover formed to fit upon and engage the pad assembly, and an articulated actuator arm pivotally coupled to the pad assembly and movable upon the cover to selectively urge the pad assembly into sealing contact with the surface. The suction pad assembly includes a pliable pad member having a rigid stem centrally affixed thereto, the stem projecting perpendicularly from the pad member and formed to engage a central opening in the cover. A compression spring set coaxially about the stem is disposed between the pad member and the inside cover to apply pressure upon the pad member. The articulated actuator arm includes a base member pivotally coupled to the stem and a mounting sleeve flexibly joined to the base member having a cup-like cavity formed to fit and move upon the base member in a rotating manner under tension provided by an extension spring coaxially engaged therethrough. The base member is formed having angled surfaces that press upon the cover in separate pivoted positions to compress or release the suction pad assembly and is adapted to be locked to the cover in the compressed position. The flexible joint between the base member and sleeve allows the actuator arm and an object mounted thereon to deflect from its normal engaged position without releasing the compressed state of the suction pad assembly and its sealing contact with the surface.

For a better understanding of these and other aspects of the present invention, reference should be made to the following detailed description taken in conjunction with the accompanying drawings in which like reference numerals and characters designate like parts throughout the figures thereof.

BRIEF DESCRIPTION OF THE DRAWINGS

For a fuller understanding of the nature and object of the present invention, references in the detailed description of the preferred embodiment set forth below shall be made to the accompanying drawings in which:

FIGS. 3A and 3B are associated side views in elevation of the present attachment device shown on a wall surface in released and engaged positions, respectively;

FIGS. 4A and 4B are associated sectional views of the attachment device taken in side elevation, similarly to that of FIGS. 3A and 3B, in respective released and engaged positions.

DETAILED DESCRIPTION OF THE INVENTION

The following is a detailed description of a preferred embodiment of the present invention and the best presently contemplated mode of its production and practice. This description is further made for the purpose of illustrating the general principles of the invention but should not be taken in a limiting sense, the scope of the invention being best determined by reference to the appended claims.

Figure 1:
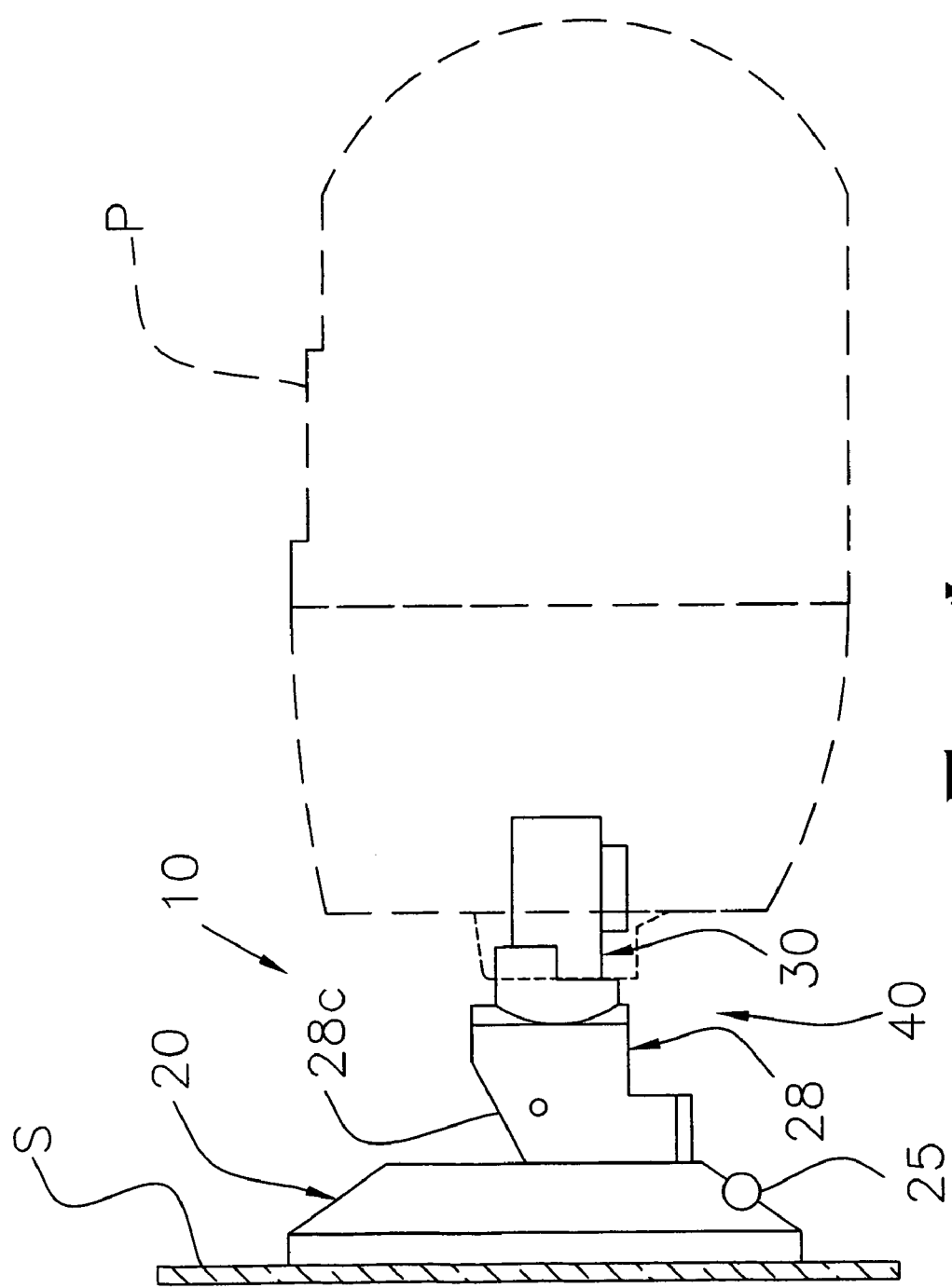
FIG. 1 is a side elevation view of the attachment device made in accordance with the present invention and shown in engaged position upon a wall surface holding an object.

Referring now to FIG. 1, an attachment device, generally designated 10, is shown engaged upon a wall surface S in mounting support of a promotional product P (shown in phantom outline) adapted to engage the extended form and configuration of the attachment device. The promotional product P may be a product display, a coupon dispenser or any other type of merchandising unit commonly used in stores for marketing purposes. The wall surface S upon which the present attachment device 10 is particularly useful is characteristically smooth and generally non-porous, such as a glass door or panel made of plastic, wood or metal. It should be understood, however, that despite this drawing depiction of the attachment device 10 in use to secure a promotional product P or the like upon a wall surface S, the attachment device may further be employed in accordance with the present invention to mount and secure any of a variety of objects, properly fitted to engage the device to other smooth, non-porous surfaces at different attitudes and angles.

The present attachment device 10 includes a cover member 20 that is a generally circular and raised shell-like structure made of a lightweight but durable rigid material such as plastic. The cover member 20 serves to surround and hold within its structure a suction pad assembly 12, better shown and described in greater detail below in reference made to FIG. 2. Atop the structure of the cover member 20, an actuator arm 40, articulated in its structure, is pivotally disposed and permitted to move upon the cover as described hereunder in greater detail. The articulated actuator arm 40 includes a base member 28, a mounting sleeve 30 flexibly coupled thereto and an extension spring 32 coaxially disposed and engaged within the base member and mounting sleeve to maintain their flexible coupling. As seen in FIG. 1, the base member 28 of actuator arm 40 is positioned in immediate contact with the top of cover member 20 while the mounting sleeve 30 of the actuator arm is disposed to extend outward from the base member and away from the cover member 20 to provide a means for fitted engagement with the promotional product D. Typically and as shown in FIG. 1, the extension of the actuator arm 40 and projection of its base member 28 and mounting sleeve 30 are substantially perpendicular to the cover member 20 and normal to the mounting surface S when the present attachment device 10 is sealingly engaged upon the surface. A conventional level indicator 25, sized to fit upon the outer surface of the cover member 20 either beneath (as shown) or above the actuator arm 40 in view of the user, is further provided to assist the user in properly positioning the attachment device 10 at the time it is engaged upon wall surface S.

Figure 2:
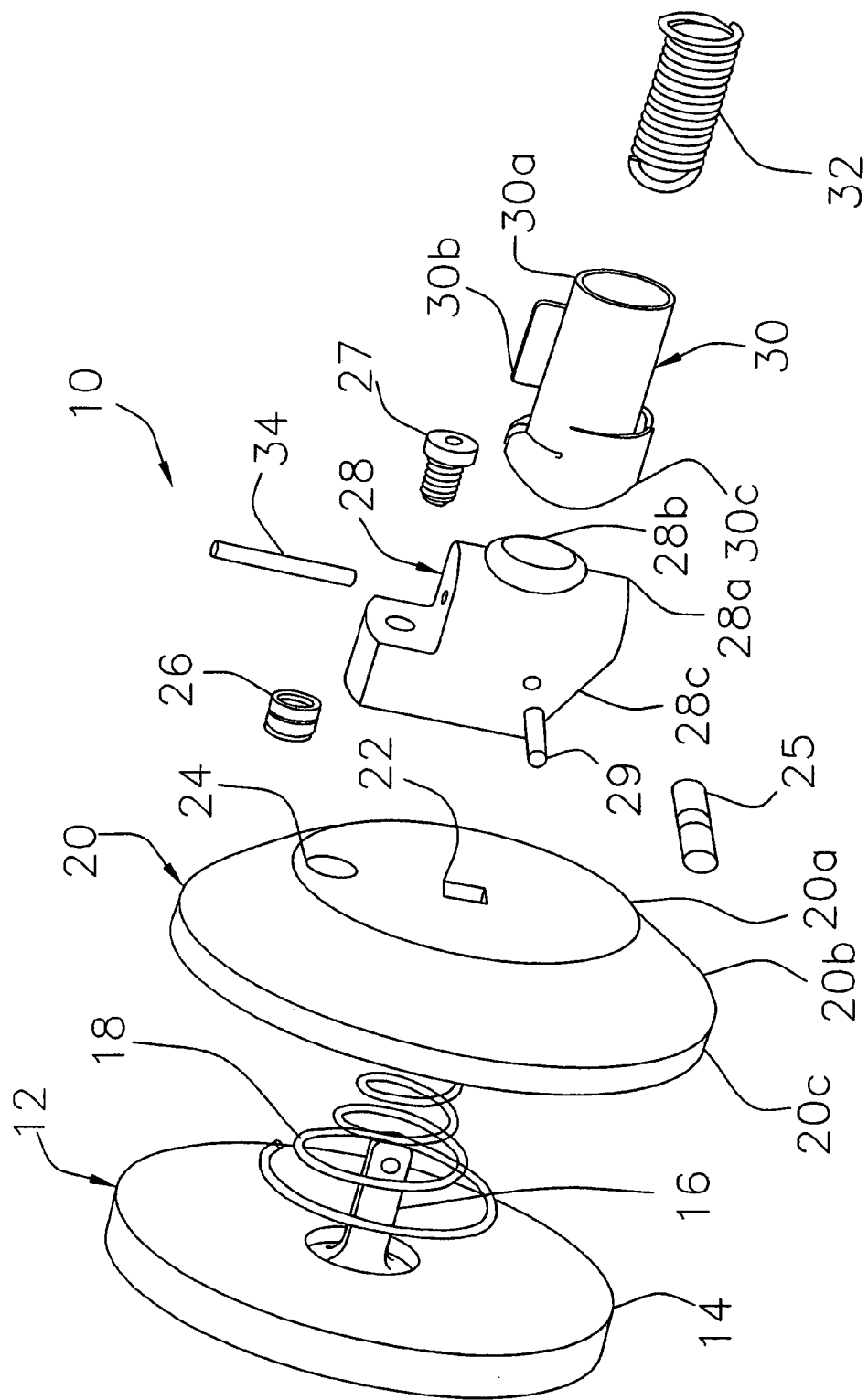
FIG. 2 is an exploded perspective view of the attachment device shown in FIG. 1.

Referring now to FIG. 2, the suction pad assembly 12 of the present attachment device 10 includes a pliable pad member 14 having a circular configuration and a rigid stem 16 affixed to the center of the pad member and made to project perpendicularly therefrom. The pad member 14 is made of a soft flexible plastic material or synthetic rubber while the stem 16 is preferably made of a hard plastic material. The stem 16 is assembled and secured to the pad member 14 by imbedding the root of the stem, typically in the form of a base plate, within the pad member using conventional molding techniques. Near the top of the stem 16, a through hole is provided to permit coupling of the stem and suction pad assembly 12 to the actuator arm 40 as detailed in the description below. The suction pad assembly 12 further includes a compression spring 18 made of conventional music wire and formed in a conical configuration. The compression spring 18 is set coaxially about the stem 16 and disposed having its larger diameter end resting upon the pad member 12.

The cover member 20 is rigid in is construction and made of a hard and durable plastic material, typically fabricated by molding. The cover member 20 has a generally circular configuration and is formed having the shape of a shallow cup with the diameter of the open end thereof being slightly larger than the diameter of the suction pad member 14. The wall surfaces of the cover member 20 include a flat, top wall 20a, an inclined perimeter wall 20b, and a bottom edge wall 20c formed around the circumference of the cover member at its open end. The flat top wall 20a serves to engage and confine the compression spring 18 on the inside of the cover member 20 while the outer surface of the top wall provide frim bearing support for the rotational movement of the actuator arm 40. A central opening 22 is formed through the top wall 20a to provide a bore through which the stem 16 of the suction pad assembly 12 may project and engage with the actuator arm 40. An off-center opening 24 further made through the top wall 20a is intended to hold and secure a threaded insert 26 that permits the actuator arm 40 to be locked in place, a described below, after placing the suction pad assembly 12 into sealing engagement with the wall surface S. The bottom edge wall 20c is sized in its diameter and extended in axial direction to closely fit and surround the suction pad 14, and particularly serves to evenly press and completely cover the perimeter of the suction pad as it is maintained in sealed contact with wall surface S, as seen more clearly in FIGS. 3B and 4B. Level indicator 25 may be attached to the inclined perimeter wall 20b in a position beneath (as shown) or above the central aperture 22 in relative alignment with the opening 24 for proper viewing by the user during initial placement of the attachment device 10.

The actuator arm 40 of the present attachment device 10 is "articulated" in the sense that it is made of parts united together by a flexible joint. In this case, the articulated actuator arm 40 includes a base member 28 pivotally disposed immediately atop the cover member 20, a mounting sleeve 30 formed to fit coaxially onto the base member and move about it in a rotational manner, and an extension spring 32 engaged under tension coaxially between the base member and the mounting sleeve. The base member 28 is a chambered body made of a similar plastic material as that of the cover member 20 and is formed having a flat bottom intended to abut and bear upon the top wall 20a of the cover member, particularly when the actuator arm 40 is placed in its "engaged" position as shown in FIGS. 3B and 4B. In this engaged position, it is noted that a set screw 27, preferably contained within but accessible through the base member 28, is disposed and aligned for entry into the threaded insert 26 on the top wall 20a of the cover member 20 to provide means for locking the actuator arm 40 and the attachment device 10 in this position and thereby prevent tampering with or theft of the device. The base member 28 is provided with a curved upper surface 28a convex in its curvature and a rounded opening 28b from the chamber of the base member that protrudes centrally from the curved upper surface. An angled surface 28c inclined relative to the flat bottom of the base member 28 is also provided for further bearing support against the top wall 20a of the cover member 20, particularly when the actuator arm 40 is placed in the "released" position shown in FIGS. 3A and 4A. A connecting pin 29 sized and fitted for insertion through the body of the base member 28 transverse to its axis is positioned to engage the through hole near the top of stem 16 for coupling the actuator arm 40 to the suction pad assembly 12 with the cover member 20 disposed therebetween.

Figure 5:
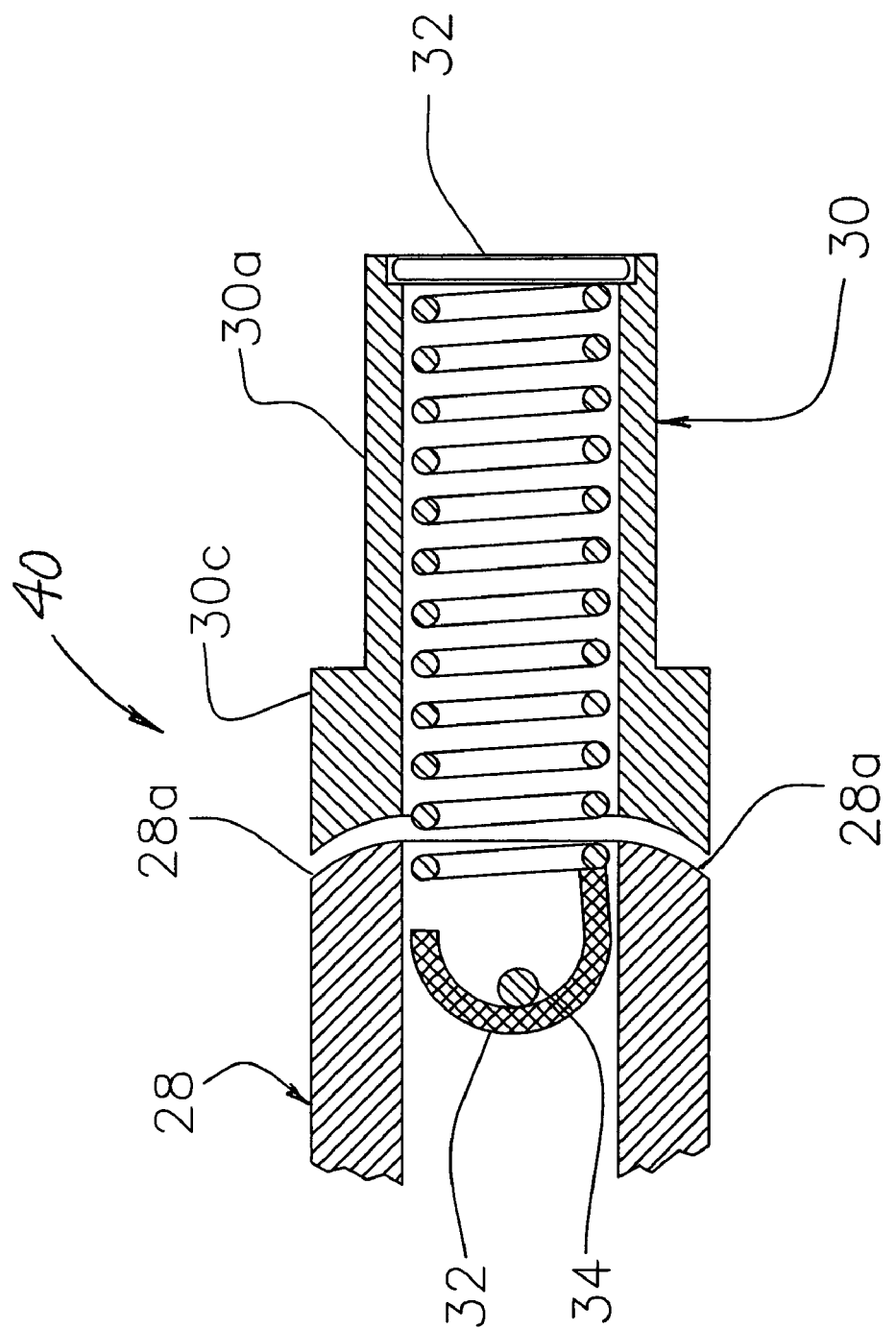
FIG. 5 is a sectional view of the present attachment device taken along the line 5-5 in FIG. 3B.

The mounting sleeve 30 of the articulated actuator arm 40 is a generally cylindrical body made of similar plastic material as that of the base member 28. The mounting sleeve 30 is formed having a tubular section 30a extending substantially the length of the sleeve with a radially projecting tab 30b to assist in the alignment and connection with the intended product P to be mounted. At the base end of the mounting sleeve 30 proximal to base member 28, a concave section 30c is integrally formed having a cup-like cavity that matingly fits upon the curved surface 28a and associated rounded opening 28b at the top of the base member. The corresponding curved mating surfaces, convex in form at the top of base member 28 and concave at the base end of the mounting sleeve 30, permit the mounting sleeve to move freely over and rotate upon the base member. The extension spring 32 is loaded under tension through the mounting sleeve and into the base member 28 with the outermost coil loop of the spring being engaged and fixed at the distal end of the tubular section 30a. The extension spring 32 is secured in place between the base member 28 and mounting sleeve 30 using a connecting pin 34 inserted and fixed within the chamber of the base member 28 to engage the innermost loop of the spring. As best viewed in FIG. 5, the intermediate joint of the articulated actuator arm 40 that is effected under tension of the extension spring 32 between the convex surface of the base member 28 and the concave surface of the mounting sleeve 30 permits deflection and rotation of the mounting sleeve relative to the set position of the base member. The flexible joint thus produced allows the actuator arm 40 to operate as intended for the selective compression of the suction pad assembly 12 and engagement of the attachment device 10 to the wall surface S while permitting deflection and rotational movements made upon the mounted product P to occur without disturbing or releasing the compressed engagement of the attachment device.

Referring now to FIGS. 3A and 3B and corresponding FIGS. 4A and 4B in cross-section, operational use of the present attachment device initiates with the proper alignment and placement of the attachment device upon the wall surface S as may be aided by level indicator 25. In this initial position shown in FIGS. 3A and 4A, the angled surface 28c of base member 28 is bearing upon the top surface 20a of cover member 20 so that the central axis and direction of the actuator arm 40 is inclined relative to the surface S. Also evident in this initial position, the suction pad member 14 is virtually flat against the wall surface S with the cover member surrounding the pad member but spaced slightly from the surface. To secure the attachment device 10 in place upon the wall surface S, actuator arm 40 is pivoted and rotated downward, as shown in the case of a wall mounting, so as to bear the flat bottom of the base member 28 upon the top surface 20a of the cover member 20. In this engaged position of the attachment device 10 shown in FIGS. 3B and 4B, the rotational movement of the actuator arm 40 pulls upon the suction pad assembly 12 via stem 16 and thereby draws the central portion of the pad member 14 slightly away from the wall surface S, creating a concave air-tight space between the wall surface and the pad member that sealingly engages the attachment device to the surface. In this engaged position, set screw 27 can be accessed through the base member 28 and fastened within insert 26 to lock the actuator arm 40 to the cover member 20 and secure the attachment device 10 in place on the wall surface S. As described above, a deflection or rotational force made upon the actuator arm 40, particularly upon the mounting sleeve 30 and any object mounted thereon will not tend to disturb the position of the base member 28 and not cause the release of the sealing engagement of the attachment device.

Therefore, it is apparent that the described invention provides an improved suction-type attachment device that is generally more effective than those heretofore devised and available for mounting and securing objects to smooth, non-porous surfaces. More particularly, the disclosed suction-type attachment device with its articulated actuator means provides strong and effective sealing contact with the surface to which its is attached with the further capability of maintaining firm attachment to the surface despite deflection of the mounted object. The described invention provides a deflectable suction-type device for attaching to a smooth wall surface that is further capable of mounting and supporting heavier objects without being detached from the wall surface. The present attachment device is also easy to implement and secure in proper position, and once secured in place on the surface, is resistant to tampering and theft. In addition, the described attachment device for non-porous surfaces is relatively inexpensive to manufacture, easy to assemble and operate, and reliable in its performance.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Accordingly, it is understood that this invention is not limited to the particular embodiment described, but rather is intended to cover modifications within the spirit and scope of the present invention as expressed in the appended claims.

What is claimed is:

1. An attachment device for mounting an object to a surface, comprising:
    suction pad means for releasably engaging the surface with an air-tight seal;
    a cover member formed to contain said suction pad means and movable thereon in the direction of the surface; and
    actuator means operatively connected to said suction pad means and pivotally bearing upon said cover member for selectively disposing said suction pad means between engaged and released positions upon the surface, said actuator means including an articulated actuator arm adapted to hold the object and flexible along the length thereof so that the air-tight seal may be maintained despite deflection of the object, said articulated actuator arm comprising a base member formed along an axis and pivotally coupled to said suction pad means, said base member being further formed having inclined surfaces adjoined to each other and adapted to bear separately upon said cover member, a sleeve member coaxially connected to said base member and rotatably disposed thereon, and a spring member coaxially engaging said base and sleeve members under tension.

2. An attachment device according to claim 1, wherein:
    said base member is provided with a curved upper surface and a rounded opening protruding centrally therefrom; and
    said sleeve member is provided with a cup-like cavity formed to matingly fit upon the curved surface and rounded opening of the base member so that said sleeve member may move about upon said base member in a rotational manner.

3. An attachment device according to claim 2, wherein the curved upper surface of said base member is convex and the cup-like cavity of said sleeve member is concave.

4. An attachment device according to claim 1, wherein said suction pad means comprises:
    a pad member pliable in construction and having a circular configuration;
    a stem centrally affixed to said pad member and projecting therefrom; and
    a compression spring coaxially disposed along said stem to urge upon said pad member.

5. An attachment device according to claim 4, wherein said pad member is made of plastic material.

6. An attachment device according to claim 4, wherein said pad member is made of synthetic rubber.

7. An attachment device according to claim 1, further comprising:
    locking means operatively connected between said articulated actuated arm and said cover member for securing said suction pad means in the engaged position.

8. An attachment device according to claim 7, further comprising:
    a level indicator attached to said cover member for proper orientation of the attachment device upon the surface.

9. A device for mounting an object to a non-porous surface, comprising:
    suction pad means for releasably engaging the surface in sealing contact therewith;
    a cover member formed to fit upon said suction pad means and movably mounted thereto; and
    an articulated actuator arm operatively connected to said suction pad means and pivotally movable upon said cover member between separate positions to selectively urge said suction pad means into sealing contact with the surface, said actuator arm being adapted to hold the object thereon and further being flexibly joined along the length thereof so that sealing contact with the surface may be maintained upon a deflection of the object, said actuator arm comprising a base member pivotally coupled to said suction pad means and formed having inclined surfaces adjoined to each other and adapted to bear upon said cover member in alternate positions to selectively compress or release said suction pad means, a sleeve member coupled to said base member and rotatably disposed thereon, and a spring member for coupling said base member and said sleeve under tension.

10. An attachment device according to claim 9, wherein:
    said base member is provided with a curved upper surface and a rounded opening protruding centrally therefrom; and
    said sleeve member is provided with a cup-like cavity formed to matingly fit upon the curved surface and rounded opening of the base member so that said sleeve member may move about upon said base member in a rotational manner.

11. An attachment device according to claim 10, wherein the curved upper surface of said base member is convex and the cup-like cavity of said sleeve member is concave.

12. An attachment device according to claim 9, wherein said suction pad means comprises:
    a pad member pliable in construction and having a circular configuration;
    a stem centrally affixed to said pad member and projecting therefrom; and
    a compression spring coaxially disposed along said stem to urge upon said pad member.

13. An attachment device according to claim 12, wherein said pad member is made of plastic material.

14. An attachment device according to claim 12, wherein said pad member is made of plastic material.

15. An attachment device according to claim 9, further comprising:
    locking means operatively connected between said articulated actuated arm and said cover member for securing said suction pad means in the engaged position.

16. An attachment device according to claim 15, further comprising:
    a level indicator attached to said cover member for proper orientation of the attachment device upon the surface.

* * * * *